United States Patent
Barve et al.

(10) Patent No.: US 11,263,164 B1
(45) Date of Patent: Mar. 1, 2022

(54) MULTIPLE FIELD PROGRAMMABLE GATE ARRAY (FPGA) BASED MULTI-LEGGED ORDER TRANSACTION PROCESSING SYSTEM AND METHOD THEREOF

(71) Applicant: Tata Consultancy Services Limited, Mumbai (IN)

(72) Inventors: Mahesh Damodar Barve, Pune (IN); Sunil Puranik, Pune (IN); Swapnil Rodi, Thane West (IN); Manoj Nambiar, Thane West (IN); Dhaval Shah, Thane West (IN)

(73) Assignee: Tata Consultancy Services Lmited, Mumbai (IN)

( * ) Notice: Subject to any disclaimer, the term of this patent is extended or adjusted under 35 U.S.C. 154(b) by 1 day.

(21) Appl. No.: 17/136,734

(22) Filed: Dec. 29, 2020

(30) Foreign Application Priority Data

Aug. 28, 2020 (IN) .............................. 202021037239

(51) Int. Cl.
| | |
|---|---|
| *G06F 1/00* | (2006.01) |
| *G06F 3/06* | (2006.01) |
| *G06F 13/42* | (2006.01) |
| *G06F 13/40* | (2006.01) |
| *H03K 19/17728* | (2020.01) |
| *G06F 9/54* | (2006.01) |

(52) U.S. Cl.
CPC .......... *G06F 13/4221* (2013.01); *G06F 9/546* (2013.01); *G06F 13/4022* (2013.01); *H03K 19/17728* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 7,197,244 B2 * | 3/2007 | Thomas | H04J 14/0232 398/72 |
| 10,326,862 B2 | 6/2019 | Bonig et al. | |
| 10,432,565 B2 | 10/2019 | Acuña-Rohter et al. | |
| 10,489,787 B2 | 11/2019 | Sheard et al. | |

(Continued)

FOREIGN PATENT DOCUMENTS

CN 102939613 A 2/2013

*Primary Examiner* — Hyun Nam
(74) *Attorney, Agent, or Firm* — Finnegan, Henderson, Farabow, Garrett & Dunner LLP

(57) ABSTRACT

Conventionally, for processing multi-legged orders, matching engines were implemented in software and were connected through Ethernet which is very slow in terms of throughput. Such traditional trading systems failed to process orders of tokens on different machines and these were summarily rejected. Present disclosure provides multiple FPGA system being optimized for processing/executing multi-legged orders. The system includes a plurality of FPGAs which are interconnected for communication via a PCIe port of a multi-port PCIe switch. Each FPGA comprise a net processing layer, a matcher, and a look-up table. Each FPGA is configured to process tokens (e.g., securities, etc.). If orders to be processed are for tokens on same FPGA where the order is received, then tokens are processed locally. Else net processing layer of a specific FPGA routes to specific order request to another FPGA where the tokens (securities) are located thereby reducing the latency and improving overall throughput.

15 Claims, 3 Drawing Sheets

(56) References Cited

U.S. PATENT DOCUMENTS

| | | | |
|---|---|---|---|
| 2010/0061263 A1* | 3/2010 | Breeding | H04L 67/12 |
| | | | 370/252 |
| 2014/0095742 A1* | 4/2014 | Guok | G06F 3/0607 |
| | | | 710/30 |
| 2018/0000471 A1 | 2/2018 | Bonig et al. | |
| 2018/0047099 A1 | 2/2018 | Bonig et al. | |
| 2018/0287964 A1* | 10/2018 | Gray | H04L 49/109 |
| 2019/0057303 A1* | 2/2019 | Burger | G06E 1/045 |
| 2019/0138890 A1* | 5/2019 | Liang | G06N 3/08 |
| 2019/0272215 A1* | 9/2019 | Olarig | G06F 3/0688 |
| 2019/0347204 A1* | 11/2019 | Du | G06F 12/0882 |

\* cited by examiner

MULTIPLE FIELD PROGRAMMABLE GATE ARRAY (FPGA) BASED MULTI-LEGGED ORDER TRANSACTION PROCESSING SYSTEM AND METHOD THEREOF

PRIORITY CLAIM

This U.S. patent application claims priority under 35 U.S.C. § 119 to: India Application No. 202021037239, filed on Aug. 28, 2020. The entire contents of the aforementioned application are incorporated herein by reference.

TECHNICAL FIELD

The disclosure herein generally relates to multi-legged order transaction processing techniques, and, more particularly, to multiple Field Programmable Gate Array (FPGA) based multi-legged order transaction processing system and method thereof.

BACKGROUND

Multi-legged order transactions may include two or more orders that are distinct from each other. Such multi-legged orders include processing of tokens on a single machine. In a typical software-based system, there is only one net processing layer component followed by order matching layer. Both net processing and order matching layers are implemented on separate machines connected through reliable channel(s) over 10G Ethernet. This would be an obvious choice for many-to-many kind of link and communication between different servers. In a conventional architecture system, matching engines are implemented in software and are connected through Ethernet which is very slow in terms of throughput. So, there are latency constraints when two matching engines need to communicate with each other to execute a multi-legged order. The latency in the network incurred is typically very high which is of the order of 10 microseconds. This reduces the order processing throughput and hence it is not a sustainable option for huge volume of orders flowing per second (e.g., hundred thousand orders/second). Moreover, traditional systems (e.g., trading systems) do not allow for scenarios wherein orders include tokens which need to be processed on different machines or otherwise such orders are summarily rejected.

SUMMARY

Embodiments of the present disclosure present technological improvements as solutions to one or more of the above-mentioned technical problems recognized by the inventors in conventional systems. For example, in one aspect, there is provided a multiple Field Programmable Gate Array (FPGA) system (MFPGAS) for executing a multi-legged order transaction. The MFPGAS comprises a first FPGA; at least one second FPGA; and a multi-port Peripheral Component Interconnect Express (PCIe) switch (106) comprising a plurality of PCIe ports, wherein each of the first FPGA and the at least one second FPGA are operatively connected to a corresponding PCIe port of the multi-port PCIe switch, wherein the first FPGA (102) comprises a first net processing layer, a first look-up table, and a first matcher, and wherein the at least one second FPGA comprises a second net processing layer, a second look-up table, and a second matcher.

In an embodiment, the first net processing layer of the first FPGA is configured to: receive, an input comprising a multi-legged order from a user, wherein the multi-legged order comprises a plurality of tokens, wherein the plurality of tokens comprises a first token and at least one second token, wherein each of the first token and the at least one second token corresponds to a distinct entity; determine, via the first look-up table, a location of the first token and at least one second token based on the input, wherein the location of the first token is distinct to the location of at the at least one second token; simultaneously transmit, via the first matcher, a message to the second net processing layer being identified via the corresponding PCIe port based on the determined location of one of the first token or at least one second token; obtain based on the message, by the first net processing layer of the first FPGA, information pertaining to number of units being processed for one of the first token or at least one second token by the second net processing layer of the second FPGA; and complete, via the first matcher, a transaction by processing the multi-legged order based on the number of units being processed for the first token and at least one second token.

In an embodiment, the input further comprises a pre-defined ratio indicative of a maximum quantity of units for the first token to the maximum quantity of units for the at least one second token.

In an embodiment, the message corresponds to the pre-defined ratio.

In an embodiment, the number of units being processed for the first token and at least one second token are identical to each other.

In another embodiment, the number of units being processed for the first token and at least one second token are distinct from each other.

In another aspect, there is provided a system for processing a multi-legged order specific to a plurality of tokens distributed across FPGAs. The system comprises: a plurality of FPGAs, each of the plurality of FPGAs comprising a net processing layer, a look-up table and a matcher; and a multi-port PCIe switch comprising a plurality of PCIe ports, wherein each of the plurality of PCIe ports is operatively connected with a corresponding FPGA from the plurality of FPGAs, and wherein each FPGA from the plurality of FPGAs communicates with another FPGA from the plurality of FPGAs through a corresponding PCIe port, wherein the net processing layer of a first FPGA from the plurality of FPGAs is configured to: receive, an input comprising a multi-legged order from a user, wherein the multi-legged order comprises a plurality of tokens, wherein each of the first token and the at least one second token corresponds to a distinct entity; determine, via the look-up table, a location of each of the plurality of tokens based on the input, wherein the location of a token is distinct to the location of another token; simultaneously transmit, via a matcher of the first FPGA, a message to a corresponding net processing layer of two or more corresponding FPGAs being identified from the plurality of FPGAs via a corresponding PCIe port based on the determined location of each of the plurality of tokens; obtain based on the message, by the net processing layer of the first FPGA, information pertaining to number of units for each of the plurality of tokens, from the corresponding net processing layer of the two or more corresponding FPGAs being identified from the plurality of FPGAs; and complete a transaction by processing the multi-legged order based on the number of units being processed for each of the of the plurality of tokens.

In an embodiment, the input comprises a pre-defined ratio indicative of a maximum quantity of units for the first token to the maximum quantity of units for the at least one second token.

In an embodiment, the message corresponds to the pre-defined ratio.

In an embodiment, the number of units being processed for the first token and at least one second token are identical to each other.

In another embodiment, the number of units being processed for the first token and at least one second token are distinct from each other.

In yet another aspect, there is provided a method for processing a multi-legged order transaction using a multiple Field Programmable Gate Array (FPGA) system (MFPGAS), the MFPGAS comprising: a first FPGA; at least one second FPGA; and a multi-port Peripheral Component Interconnect Express (PCIe) switch comprising a plurality of PCIe ports, wherein each of the first FPGA and the at least one second FPGA are operatively connected to a corresponding PCIe port of the multi-port PCIe switch, wherein the first FPGA comprises a first net processing layer, a first look-up table, and a first matcher, and wherein the at least one second FPGA comprises a second net processing layer, a second look-up table, and a second matcher. The method comprises: receiving, by the first net processing layer of the first FPGA, an input comprising a multi-legged order from a user, wherein the multi-legged order comprises a plurality of tokens, the plurality of tokens comprising a first token and at least one second token, wherein each of the first token and the at least one second token corresponds to a distinct entity; determining, via the first look-up table of the first FPGA, a location of each of the first token and the at least the second token based on the input; simultaneously transmitting, via the first matcher of the first FPGA, a message to the second net processing layer being identified via the corresponding PCIe port based on the determined location of one of the first token or at least one second token; obtaining based on the message, by the first net processing layer of the first FPGA, information pertaining to number of units being processed for one of the first token or at least one second token from the second net processing layer of the second FPGA; and completing, by the first net processing layer of the first FPGA, a transaction by processing the multi-legged order based on the number of units processed for the first token and at least one second token.

In an embodiment, the input further comprises a pre-defined ratio indicative of a maximum quantity of units for the first token to the maximum quantity of units for the at least one second token.

In an embodiment, the message corresponds to the pre-defined ratio.

In an embodiment, the number of units being processed for the first token and at least one second token are identical to each other.

In another embodiment, the number of units being processed for the first token and at least one second token are distinct from each other.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
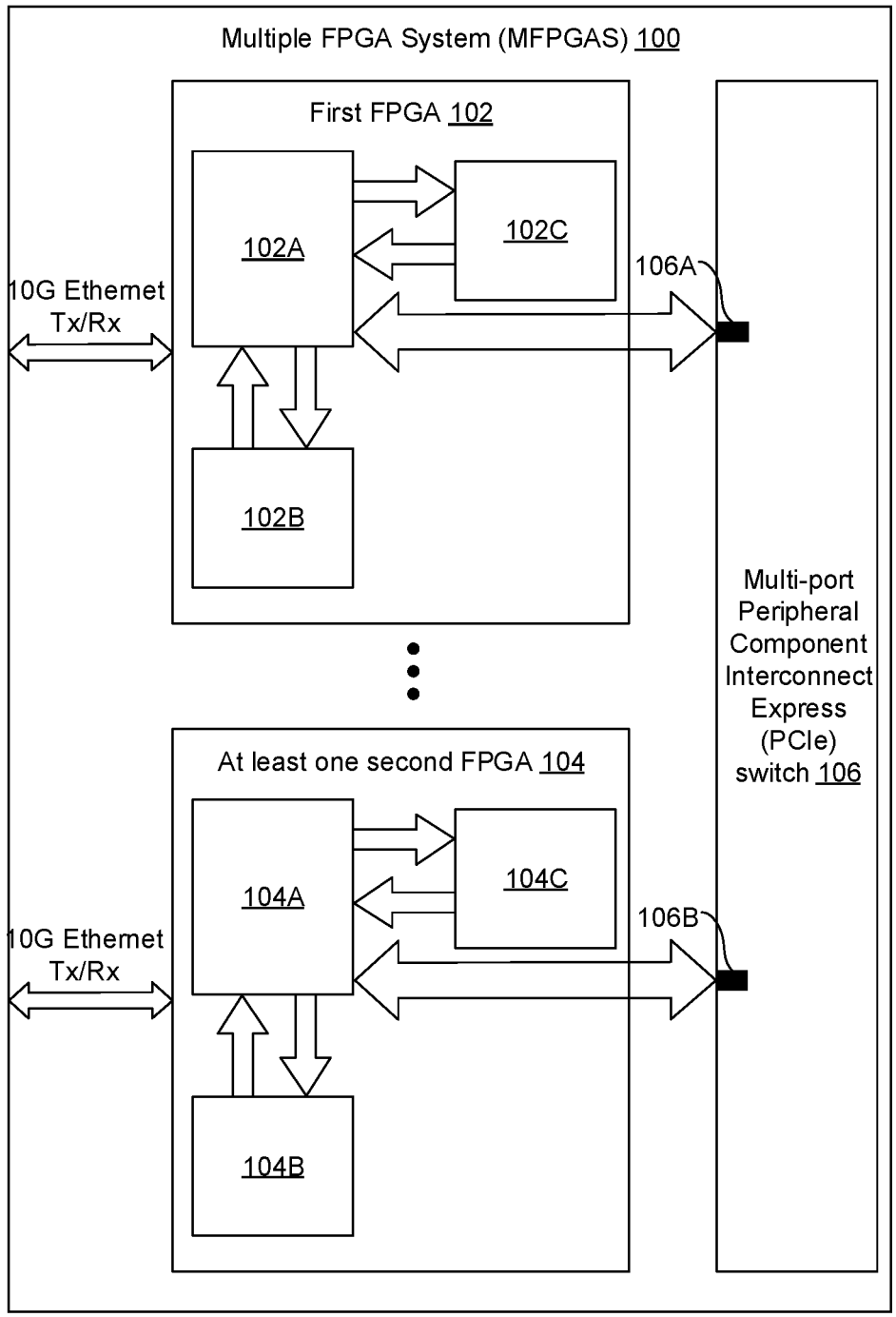
FIG. 1 illustrates a multiple Field Programmable Gate Array (FPGA) system (MFPGAS) for executing a multi-legged order transaction, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

A multi-legged order transaction refers to two or more orders that may or may not be related. Such multi-legged orders include processing of tokens on a single machine. In a typical software-based system, there is only one net processing layer component followed by order matching layer for all machines. In other words, both net processing and order matching layers are implemented on separate machines connected through reliable channel(s) over 10G Ethernet. This would be obvious choice for many-to-many kind of link and communication between different servers. In a conventional architecture system, matching engines are implemented in software and are connected through reliable channels over 10G Ethernet. So, there are latency constraints when two matching engines need to communicate with each other to execute a multi-legged order. The latency in the network incurred is typically very high which is of the order of 10 microseconds. This reduces the order processing throughput and hence it is not sustainable option for huge volume of orders flowing per second (e.g., hundred thousand orders/second). Moreover, traditional systems (e.g., trading systems) do not allow for scenarios wherein orders include tokens which need to be processed on different machines or otherwise such orders are summarily rejected.

Embodiments of the present disclosure provide multiple Field Programmable Gate Array (FPGA) system that is optimized for processing/executing multi-legged orders. More specifically, the present disclosure provides a multiple FPGA system that comprises a plurality of FPGAs, each of the plurality of FPGAs are connected with each other for communication via a corresponding Peripheral Component Interconnect Express (PCIe) port of a multi-port PCIe switch. Each of the FPGAs comprise a net processing layer, a matcher, and a look-up table (also referred as token port (or token-port) look-up table. Each of the FPGAs is configured to process tokens (e.g., securities, and the like). If the orders to be processed are for tokens on the same FPGA card where the order is received, then the tokens are processed locally. Else the net processing layer of a specific FPGA routes to a specific order request to another FPGA board where the tokens(securities) are located. In a nutshell, the present disclosure implements a multiple FPGA based multi-legged order transaction processing system and method which receive incoming order request packets on Ethernet RX port and check whether the request specifies a multi-legged order. If multi-legged order is requested, the system checks whether all the legs of the order are to be processed locally or by other FPGA(s). Messages between each of the FPGAs are exchanged comprising details of number of units blocked or allocated for each of the tokens, thereby confirming completion of the transaction.

More specifically, system and method of the present disclosure may be implemented in trading system implemented wherein the trading system consists of multiple FPGA boards, with one FPGA on each board (wherein each FPGA comprises both Net processing layer and the matcher (also referred as order matcher/market matcher and interchangeably used herein) connected to a back plane. The backplane houses a multi-port PCIe switch through which FPGA boards communicate with each other. The net processing layer as described in the system and method of the present disclosure performs all the functions such as order validation, key value lookups, token to port look up, etc. Order validation involves checking the ranges of various fields of the order while key value lookups perform mapping operations. Each security is identified by a token and since all the tokens may or may not be processed by same FPGA board, the token port lookup block routes a specific token to the appropriate FPGA board, through PCIe Switch. The token port lookup contains the mapping information of tokens and the PCIe port to which the specific FPGA board is connected. The order matcher (also referred as the matcher or order processing block and interchangeably used herein) and the net processing layer/net processing block are using a high-speed parallel on-chip bus to reduce the latency. The order processing block performs the matching of orders (e.g., sale and buy orders) and returns the response to the net processing layer, which sends it onto Ethernet network back to user. The multi-port PCIe switch as implemented by the system and method of the present disclosure is used for communication between the FPGA boards (e.g., a first FPGA and/or at least one second FPGA) during the order processing. When the net processing layer receives an order from one or more users and if the particular token is not being processed by the FPGA on the same board, the net processing layer routes that token to appropriate FPGA board (which processes that token) through PCIe switch. During the processing of multi-legged orders, if the tokens required by a particular multi-legged order are not present on same FPGA board, the net processing layer routes the tokens to the corresponding boards which processes those tokens and further receives responses from the boards processing respective tokens.

Figure 2:
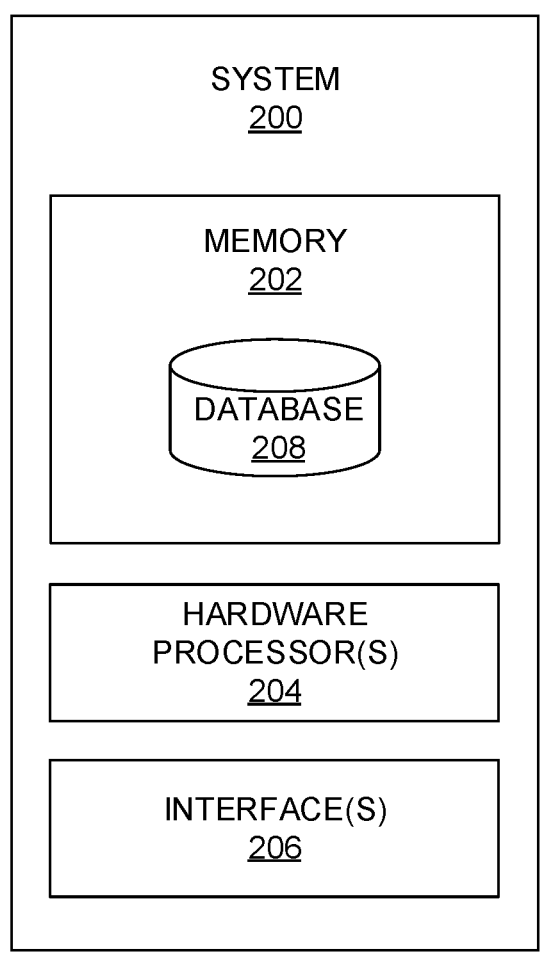
FIG. 2 illustrates a system for enabling execution of the multi-legged order transaction using the MFPGAS of FIG. 1, in accordance with an embodiment of the present disclosure.
Figure 3:
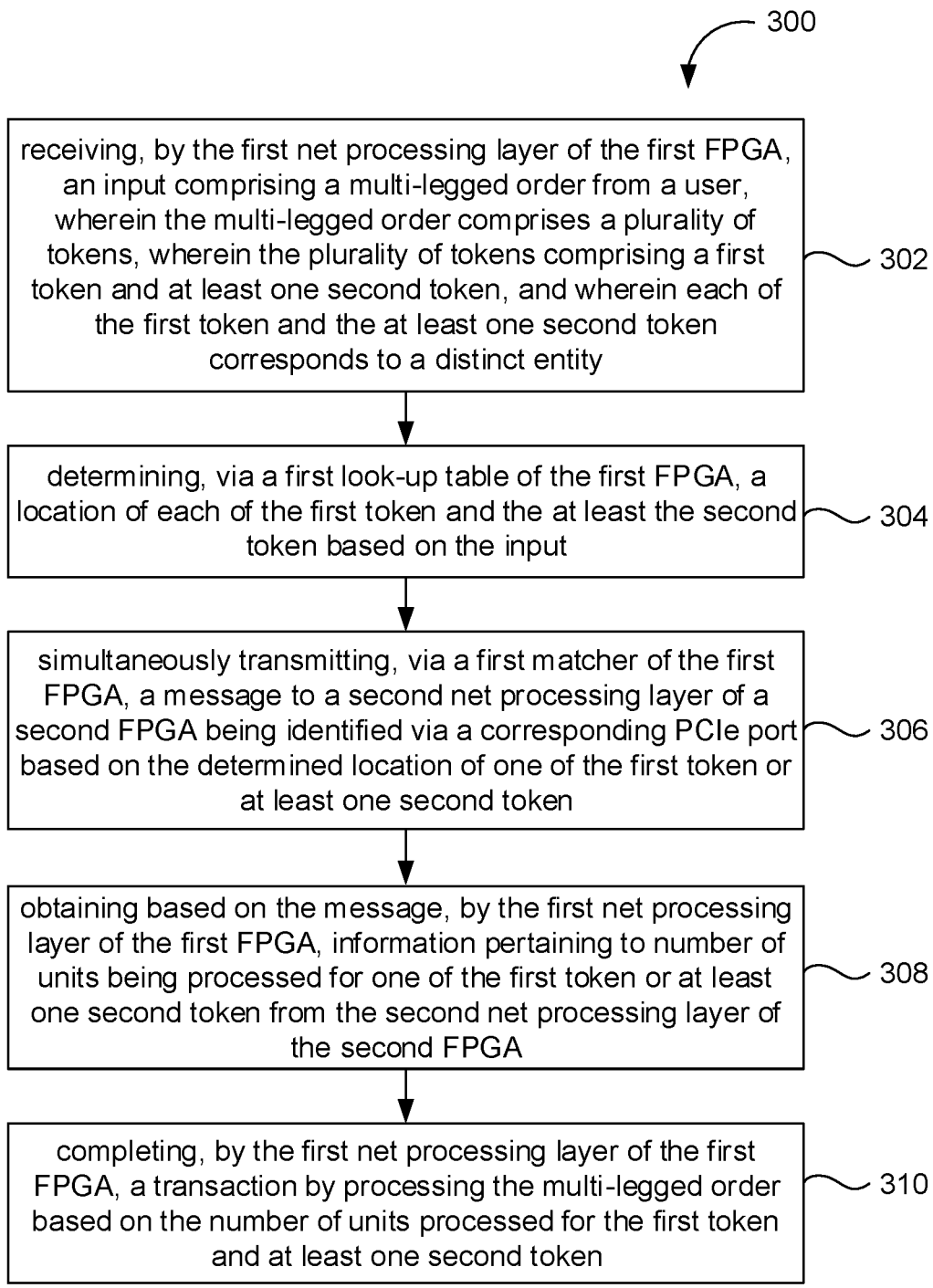
FIG. 3 depicts an exemplary flow chart illustrating a method for executing a multi-legged order transaction, using the MFPGAS of FIG. 1 and the system of FIG. 2, in accordance with an embodiment of the present disclosure.

Referring now to the drawings, and more particularly to FIGS. 1 through 3, where similar reference characters denote corresponding features consistently throughout the figures, there are shown preferred embodiments and these embodiments are described in the context of the following exemplary system and/or method.

FIG. 1 illustrates a multiple Field Programmable Gate Array (FPGA) system 100 for executing a multi-legged order transaction, in accordance with an embodiment of the present disclosure. As depicted in FIG. 1, the multiple Field Programmable Gate Array (FPGA) system (MFPGAS) 100 comprises a plurality of FPGAs (e.g., a first FPGA 102 and at least one second FPGA 104), wherein each of the plurality of FPGAs comprises a net processing layer, a matcher (also referred as an order matcher and interchangeably used herein), and a look-up table (also referred as token port look-up table and interchangeably used herein). The MFPGAS 100 may also be referred as multi-legged order transaction system (MLOTS) and interchangeably used herein. The MFPGAS 100 further comprises a multi-port Peripheral Component Interconnect Express (PCIe) switch (MPS) 106 comprising a plurality of PCIe ports (e.g., a first corresponding PCIe port 106A and a second corresponding PCIe port 106B). Each FPGA from the plurality of FPGAs is communicatively and operatively coupled to the MPS via a corresponding PCIe port. Each FPGA from the plurality of FPGAs communicates with another FPGA through the MPS via the corresponding PCIe port. The above description is better understood by way of an example. For instance, considering there is the first FPGA 102 and the at least one second FPGA 104 as depicted in FIG. 1. The first FPGA 102 comprises a first net processing layer 102A, a first look-up table 102B, and a first matcher 102C. Similarly, the at least one second FPGA 104 comprises a second net processing layer 104A, a second look-up table 104B, and a second matcher 104C. Each of the first FPGA 102 and the at least one second FPGA 104 are connected to the MPS 106 having the plurality of PCIe ports 106A-B. For instance, the first FPGA 102 is connected to the MPS 106 via the first corresponding PCIe port 106A and the second FPGA 102 is connected to the MPS 106 via the second corresponding PCIe port 106B. The MFPGAS 100 may either be an integral part of a system (e.g., system 200 of FIG. 2) or externally connected to the system 200 of FIG. 2 via one or more communication interfaces. Thus, MFPGAS 100 being an integral part of the system 200 or externally connected to the system 200 via one or more communication interfaces, the MFPGAS 100 is configured to execute a multi-legged order thereby completing a transaction thereof.

In relation to the above, FIG. 2 illustrates a system 200 for enabling execution of the multi-legged order transaction using the MFPGAS 100 of FIG. 1, in accordance with an embodiment of the present disclosure. In an embodiment, the system 200 includes one or more hardware processors 204, communication interface device(s) or input/output (I/O) interface(s) 206 (also referred as interface(s)), and one or more data storage devices or memory 202 operatively coupled to the one or more hardware processors 104. The one or more processors 204 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 206 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server. Examples of devices that can be connected to the system 200 via the I/O interface device(s) 206, comprise one or more of the MFPGAS 100 as depicted in FIG. 1 to perform the methodologies described herein.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 208 is comprised in the memory 202, wherein the database 208 may comprise information pertaining to processing of transactions related to a plurality of tokens for an incoming multi-legged order.

The memory 202 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

FIG. 3, with reference to FIGS. 1-2, depicts an exemplary flow chart illustrating a method 300 for executing a multi-legged order transaction, using the MFPGAS 100 of FIG. 1 and the system 200 of FIG. 2, in accordance with an embodiment of the present disclosure. In an embodiment, the system(s) 200 comprises one or more data storage devices or the memory 102 operatively coupled to the one or more hardware processors 104 and is configured to store instructions for execution of steps of the method described herein by the multiple Field Programmable Gate Array (FPGA) system (MFPGAS) 100. The MFPGAS 100 comprises the plurality of FPGAs (e.g., the first FPGA 102 and the at least one second FPGA 104), wherein each of the plurality of FPGAs comprises a net processing layer, a matcher (also referred as an order matcher and interchangeably used herein), and a look-up table (also referred as token port look-up table and interchangeably used herein). The steps of the method 300 of the present disclosure will now be explained with reference to components of the multiple Field Programmable Gate Array (FPGA) system 100 of FIG. 1, the system 200 of FIG. 2, and the flow diagram as depicted in FIG. 3. In an embodiment, at step 302 of the present disclosure, the first net processing layer 102A of the first FPGA 102 receives an input comprising a multi-legged order from a user. Information such as (i) details of token number, (ii) each token being tagged to a specific PCIe port. Number of units available for specific token are stored in each matcher of each FPGA from the MFPGAS 100. Therefore, at any given point of time, when the multi-legged order comprises the plurality of tokens, any of the FPGA from the MFPGAS 100 may receive the multi-legged order comprising the plurality of tokens. In an embodiment, the multi-legged order comprises a plurality of tokens, the plurality of tokens comprising a first token and at least one second token wherein each of the first token and the at least one second token corresponds to a distinct entity. For instance, two or more tokens from the plurality of tokens are specific to a corresponding unique entity. For instance, the first token, say token T1 may be specific to a first entity say E1 (e.g., an ABC company) and the at least one second token say token T2 may be specific to a second entity say E2 (e.g., a XYZ company). In the present disclosure, the expression 'first token' may also be referred as T1 token, token T1, first token T1 or simply T1 and may be interchangeably used herein, in one example embodiment. Similarly, the expression 'second token' may also be referred as T2 token, token T2, second token T2 or simply T2 and may be interchangeably used herein, in one example embodiment of the present disclosure. The two or more tokens from the plurality of tokens refer to securities, in one example embodiment of the present disclosure. The input further comprises a token ratio (also referred as a pre-defined ratio and interchangeably used herein) specific to the first token and the at least one second token to be processed. In other words, the pre-defined ratio is indicative of a maximum quantity of units for the first token to the maximum quantity of units for the at least one second token.

In an embodiment, at step 304 of the present disclosure, the first net processing layer 102A of the first FPGA 102 determines, via the first look-up table 102A of the first FPGA 102, a location of each of the first token and the at least the second token based on the input. The first net processing layer 102A of the first FPGA 102 determines a PCIe port and corresponding FPGA which is processing the token T1 and the token T2 as information such as (i) details of token, (ii) each token being tagged to a specific PCIe port, (iii) a corresponding FPGA comprising the token, (iv) number of units available for specific token are stored in each look-up table of each FPGA from the MFPGAS 100. In this manner, a net processing layer in a corresponding FPGA determines how much trade can be executed considering the ratio in multi-legged order and maximum quantities/units of trade possible.

In an embodiment, at step 306 of the present disclosure, the first net processing layer 102A of the first FPGA 102 transmits, via the first matcher 102C, a message to the second net processing layer 104A being identified via the corresponding PCIe port based on the determined location of one of the first token or at least one second token. Consider a scenario that location of the token T1 determined as the first FPGA 102 and location of the token T2 determined as the at least one second FPGA 104. In an alternative scenario, the location of the token T1 may be determined as the at least one second FPGA 104 and location of the token T2 may be determined as the first FPGA 102. Depending upon the location of the tokens T1 and T2, the first net processing layer 102A transmits a message via the first matcher 102C to the second net processing layer 104A of the at least one second FPGA 104. The message corresponds to the pre-defined ratio, in one embodiment of the present disclosure. In other words, message pertaining to processing of only other token (T1 or T2) is transmitted based on a token that is present in the first FPGA 102. Consider the token T1 is determined to be in the first FPGA 102 and the token T2 to be in the at least one second FPGA 104. Therefore, the first net processing layer 102A transmits a message via the first matcher 102C to the second net processing layer 104A of the at least one second FPGA 104 for processing a specific number of units for the at least one second token T2. Based on the message received by the at least one second FPGA 104, the second matcher 102C fetches information pertaining to the number of units from the second look-up table 104B and accordingly allocates or blocks number of units for the token T2 of E2 (e.g., the XYZ company). The second net processing layer 104A of the at least one second FPGA 104 then communicates a confirmation message back to the first net processing layer 102A via the second matcher 102C. Since the confirmation message includes the number of units allocated based on the input. Optionally, the second net processing layer 104A may communicate details of units available/comprised in the at least one second FPGA 104 to the first FPGA 102. Likewise, the token T1 is processed in the first FPGA 102 by the first net processing layer 102A to block or allocate number of units specific to the first token T1. In other words, the first net processing layer 102A allocates number of units (securities) for the first token T1 of E1 (e.g., the ABC company). Based on the allocation of number of units by both the FPGAs (e.g., the first FPGA 102 and the at least one second FPGA 104), the first FPGA 102 then completes the transaction of the multi-legged order. In other words, at step 308 of the present disclosure, the first FPGA 102 completes the transaction by processing the multi-legged order based on the number of units being processed (or allocated) for the first token and at least one second token by the first FPGA 102 and the at least one second FPGA 104 respectively.

There could be instances wherein for the incoming multi-legged order, a token say T1 may not be stored in the first FPGA 102, but rather stored in another FPGA (e.g., a third FPGA—not shown in FIGS.) of the MFPGAS 100. In such scenarios, the first FPGA 102 may determine that location and transmit a message to the third FPGA to allocate specific number of units for the token. This would mean that whether a token is stored in a specific FPGA or not, and if there are tokens stored in other FPGAs within the MFPGAS 100 that specific FPGA can still serve as the first FPGA and determine location of all tokens that may be present in other FPGAs and accordingly transmit a message to the remaining FPGAs to allocate or block a number of units for respective token. The specific FPGA serving as the first FPGA 102 then receives a confirmation message from the remaining FPGAs on number of units allocated for each respective token and completes the transaction by processing the multi-legged order.

The above description can be better understood by way of following example. Consider an incoming multi-legged order comprising two or more tokens as P1, P2 and Pn respectively. Assuming the MFPGAS 100 includes 4 FPGAs F1, F2, F3 and F4. As mentioned above, at any given point of time, when the multi-legged order comprises the plurality of tokens, any of the FPGA from the MFPGAS 100 may receive the multi-legged order comprising the plurality of tokens as an input. Assuming FPGA F1 receives the multi-legged order comprising tokens as P1, P2 and Pn of entities E1 (e.g., say company A), E2 (e.g., say company B) and En (e.g., say company C) from a user. The user may also provide a further input on the securities say 20:30:40. The MFPGAS 100 interprets the input to be as 2:3:4. Now the MFPGAS 100 initiates the multi-legged order and completes the transaction if it has found 2× number of orders of E1, 3× number of orders of E2 and 4× number of orders of E4 where x is the maximum possible number for the input price that is given by the user. In other words, along with the ratio the user also provides an input price. The transaction for the multi-legged order is initiated and completed only if the system and method are able to process the tokens within the input price amount specified by the user. For instance, say the input price is specified as 'x' rupees/'y' USD (or 'x' INR or 'y' USD with the ratio 2:3:4 (where x is the maximum possible number for the input price that is given by the user). This means the system 100 should process tokens in this specific ratio within the specified input price. In other words, the system (e.g., a trading system) completes the request only when it has found 2× number of orders of entity E1, 3× number of orders of entity E2 and 4× number of orders of entity E3 only if the token price (e.g., securities price) is equal to or less than the user specified price. Say FPGA F1 then determines location of each of these tokens P1, P2 and Pn. Assuming P1 location for E1 is F2 (in other words, securities P1 of E1 are comprised in F2), P2 location for E3 is F4 (in other words, securities P2 of E2 are comprised in F4) and P3 location for E3 is F3 (in other words, securities P3 of E3 are comprised in F2). FPGA F1 then transmits a message to each of the other FPGAs F2, F3 and F4 to allocate specific number of units based on the input. The message comprises a maximum quantity of units that each of the net processing layer comprised in the respective FPGAs (F2, F3 and F4) is required to process for the tokens P1, P2 and Pn respectively. Each of the FPGAs F2, F3 and F4 then block/allocate the number of units specified in the message received from the FPGA F1 and communicate a confirmation message indicative the number of units allocated against each of the tokens back to the FPGA F1. In other words, FPGA F2 communicates a confirmation message indicative of number of units allocated for taken P1 of E1. FPGA F4 communicates a confirmation message indicative of number of units allocated for taken P2 of E2 and FPGA F3 communicates a confirmation message indicative of number of units allocated for taken P3 of E3. For instance, the number of units processed/allocated (e.g., say 20 securities allocated) for one token (e.g., P1 of E1) by each FPGA (e.g., FPGA F2) may be different to the number of units processed/allocated (e.g., say 30 and 40 securities allocated) for other tokens (e.g., P2 of E2 and P3 of E3) by each FPGA (e.g., FPGA F3 and FPGA F4).

As can be observed, though F1 does not have any token requests for processing, it can still serve a master FPGA and coordinate with other FPGAs to determine which of the tokens need to be processed by other FPGAs within the MFPGAS 100. Further, though in the present disclosure, examples are provided indicating that one FPGA processes one token, it is to be understood to a person having ordinary skill in the art or a person skilled in the art that a specific FPGA can process as many as tokens possible provided the details and units are stored in that specific FPGA. For instance, the first FPGA 102 can process both the first token T1 and the at least one second token T2 locally within the first FPGA 102 provided the first FPGA 102 is configured with details of both the first token T1 and the at least one second token T2 and has information pertaining to units for the first token T1 and the at least one second token T2 comprised in the first look-up table 1028 so as to enable the first net processing layer 102A to block or allocate the number of units for both the first token T1 and the at least one second token T2 based on the input received (e.g., from a user). Likewise, the at least one second FPGA 104 can also perform in a similar fashion wherein at least one second FPGA 104 can process both the first token T1 and the at least one second token T2 locally within the second FPGA 104 provided the second FPGA 104 is configured with details of both the first token T1 and the at least one second token T2 and has information pertaining to units for the first token T1 and the at least one second token T2 comprised in the second look-up table 104B so as to enable the second net processing layer 102B to block or allocate the number of units for both the first token T1 and the at least one second token T2 based on the input received (e.g., from the user).

It is to be understood by a person having ordinary skill in the art or person skilled in the art that though the present disclosure described the method with examples with various ratios for the tokens comprised in the multi-legged order (20:30:40), it is to be understood by a person having ordinary skill in the art or person skilled in the art that tokens with 1:1:1 ratio can also be similarly processed by the MFPGAS 100 and such examples shall not be construed as limiting the scope of the present disclosure. In other words, the number of units processed/allocated (e.g., say 20 securities allocated) for one token (e.g., P1 of E1) by each FPGA (e.g., FPGA F2) may be identical to the number of units processed/allocated for other tokens (e.g., P2 of E2 and P3 of E3) by each FPGA (e.g., FPGA F3 and FPGA F4).

Existing approaches of processing a multi-legged transaction tend to be implemented entirely in software-based systems. As mentioned above, software-based approaches have latency issues. The latency taken in software is too high and hence cannot be tolerated by any trading system. Due to these, 2-legged and 3-legged order processing is just not allowed if the securities reside on different machines. In the case of FPGA implementation-based systems such as the system and method of the present disclosure, the latencies are very low and very much in tolerable limits. Hence the FPGA implementation architecture is acceptable. Specifically, present disclosure implements multiple FPGA based system, wherein each FPGA comprises securities pertaining to a unique entity. In other words, securities of one entity are comprised in one FPGA and security of another entity are comprised in another FPGA of the multiple FPGA based system. Further, the system of the present disclosure implements a multi-port PCIe switch, which is a very low latency, switch for interconnecting these various FPGAs as depicted in FIG. 1. Hence, the system and method of present disclosure not only provide low latency in design but also in the approach the multi-legged order transaction is completed. Due to the inherent nature of low latency of the system and method, the present disclosure enables the system and method to process 2-legged, 3-legged, and so on (e.g., n-legged where n>=2) orders in a trading system.

Further such multi-legged order processing can also be realized wherein the FPGAs are connected via a network rather than a PCIe switch. However, the communication between FPGAs through PCIe switch takes place very fast compared to the FPGAs being in same or separate machines connected through a network, where delays could be very high. For the duration of the communication, trade on token 1 and token 2 needs to be disabled in a network kind of set-up. However, this time is very small (order of magnitude less—in the present disclosure, through experiments, it was observed to be of a few 100 nanoseconds as compared to 10 microseconds in software as is in the traditional trading systems) with FPGAs communicating through PCIe switch compared to the FPGAs connected on the network.

Based on realization/experiments of the system and method of the present disclosure vis-à-vis approaches of the conventional systems, it is observed that in traditional software-based systems, the interconnection done between different machines/systems is through protocols such as an Ethernet which are very slow whereas in the present disclosure the FPGAs are connected with each other for communication and processing of transaction via the PCIe switch. It was observed through experiments and research by the embodiments of the present disclosure that the PCIe switch is order of magnitude (40 times) faster than the Ethernet. Thus, the throughput that can be obtained by performing the method of the present disclosure is of the order of magnitude higher than conventional/traditional software-based system which are implemented on a network. Further, in terms of throughput timings, the throughput for execution in conventional/traditional software-based systems implemented on the network is observed to be approximately 500k million transactions per second. Whereas, throughput in case of FPGA implementation by the system and method of the present disclosure is around 4 million transactions per second.

Furthermore, in the conventional/traditional software-based systems if there are multilegged orders with the securities being placed on different physical machines/systems, then such orders are summarily rejected. This is because due to inherent nature of the conventional/traditional software-based systems for not being able to execute the orders within a stipulated time. However, with the implementation of the MFPGAS 100 of the present disclosure wherein multiple FPGAs are used which are not only fast in nature (inherent properties/characteristics of FPGAs), any of multi-legged orders can be processed and/or executed to complete the transaction within the stipulated time. Moreover, the MFPGAS can incorporate as many as FPGA architectures with each FPGA architecture having a corresponding net processing layer, a look-up table, and a matcher (or order matcher) thus making the MFPGAS implementation a flexible and scalable design. Such flexibility and scalability of the MFPGAS may be realized based on the number of units to be/being stored for each token and number of entities being (or capable of being) programmed in each of the FPGAs.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a Field-Programmable Gate Array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A multiple Field Programmable Gate Array (FPGA) system (MFPGAS), comprising:
   a first FPGA;
   at least one second FPGA; and
   a multi-port Peripheral Component Interconnect Express (PCIe) switch comprising a plurality of PCIe ports,
   wherein each of the first FPGA and the at least one second FPGA are operatively connected to a corresponding PCIe port of the multi-port PCIe switch,
   wherein the first FPGA comprises a first net processing layer, a first look-up table, and a first matcher,
   wherein the at least one second FPGA comprises a second net processing layer, a second look-up table, and a second matcher, and
   wherein the first net processing layer of the first FPGA is configured to:
   receive, an input comprising a multi-legged order from a user, wherein the multi-legged order comprises a plurality of tokens, wherein the plurality of tokens comprises a first token and at least one second token, and wherein each of the first token and the at least one second token corresponds to a distinct entity;
   determine, via the first look-up table, a location of the first token and at least one second token based on the input, wherein the location of the first token is distinct to the location of at the at least one second token;
   simultaneously transmit, via the first matcher, a message to the second net processing layer being identified via the corresponding PCIe port based on the determined location of one of the first token or at least one second token;
   obtain based on the message, by the first net processing layer of the first FPGA, information pertaining to number of units being processed for one of the first token or at least one second token by the second net processing layer of the second FPGA; and
   complete, via the first matcher, a transaction by processing the multi-legged order based on the number of units being processed for the first token and at least one second token.

2. The MFPGAS of claim 1, wherein the input further comprises a pre-defined ratio indicative of a maximum quantity of units for the first token to the maximum quantity of units for the at least one second token.

3. The MFPGAS of claim 1, wherein the message corresponds to the pre-defined ratio.

4. The MFPGAS of claim 1, wherein the number of units being processed for the first token and at least one second token are identical to each other.

5. The MFPGAS of claim 1, wherein the number of units being processed for the first token and at least one second token are distinct from each other.

6. A system for processing a multi-legged order specific to a plurality of tokens distributed across FPGAs, comprising:

a plurality of FPGAs, each of the plurality of FPGAs comprising a net processing layer, a look-up table and a matcher; and a multi-port Peripheral Component Interconnect Express (PCIe) switch comprising a plurality of PCIe ports, wherein each of the plurality of PCIe ports is operatively connected with a corresponding FPGA from the plurality of FPGAs, and wherein each FPGA from the plurality of FPGAs communicates with another FPGA from the plurality of FPGAs through a corresponding PCIe port, wherein the net processing layer of a first FPGA from the plurality of FPGAs is configured to:

receive, an input comprising a multi-legged order from a user, wherein the multi-legged order comprises a plurality of tokens, and wherein each of the first token and the at least one second token corresponds to a distinct entity;

determine, via the look-up table, a location of each of the plurality of tokens based on the input, wherein the location of a token is distinct to the location of another token;

simultaneously transmit, via a matcher of the first FPGA, a message to a corresponding net processing layer of two or more corresponding FPGAs being identified from the plurality of FPGAs via a corresponding PCIe port based on the determined location of each of the plurality of tokens;

obtain based on the message, by the net processing layer of the first FPGA, information pertaining to number of units for each of the plurality of tokens, from the corresponding net processing layer of the two or more corresponding FPGAs being identified from the plurality of FPGAs; and complete a transaction by processing the multi-legged order based on the number of units being processed for each of the of the plurality of tokens.

7. The system of claim 6, wherein the input further comprises a pre-defined ratio indicative of a maximum quantity of units for the first token to the maximum quantity of units for the at least one second token.

8. The system of claim 7, wherein the message corresponds to the pre-defined ratio.

9. The system of claim 6, wherein the number of units being processed for the first token and at least one second token are identical to each other.

10. The system of claim 6, wherein the number of units being processed for the first token and at least one second token are distinct from each other.

11. A method for processing a multi-legged order transaction using a multiple Field Programmable Gate Array (FPGA) system (MFPGAS), the MFPGAS comprising:

a first FPGA;

at least one second FPGA; and a multi-port Peripheral Component Interconnect Express (PCIe) switch comprising a plurality of PCIe ports, wherein each of the first FPGA and the at least one second FPGA are operatively connected to a corresponding PCIe port of the multi-port PCIe switch, wherein the first FPGA comprises a first net processing layer, a first look-up table, and a first matcher, and wherein the at least one second FPGA comprises a second net processing layer, a second look-up table, and a second matcher, the method comprising:

receiving, by the first net processing layer of the first FPGA, an input comprising a multi-legged order from a user, wherein the multi-legged order comprises a plurality of tokens, wherein the plurality of tokens comprising a first token and at least one second token, and wherein each of the first token and the at least one second token corresponds to a distinct entity;

determining, via the first look-up table of the first FPGA, a location of each of the first token and at least the second token based on the input;

simultaneously transmitting, via the first matcher of the first FPGA, a message to the second net processing layer being identified via the corresponding PCIe port based on the determined location of one of the first token or at least one second token;

obtaining based on the message, by the first net processing layer of the first FPGA, information pertaining to number of units being processed for one of the first token or at least one second token from the second net processing layer of the second FPGA; and completing, by the first net processing layer of the first FPGA, a transaction by processing the multi-legged order based on the number of units processed for the first token and at least one second token.

12. The method of claim 11, wherein the input further comprises a pre-defined ratio indicative of a maximum quantity of units for the first token to the maximum quantity of units for the at least one second token.

13. The method of claim 12, wherein the message corresponds to the pre-defined ratio.

14. The method of claim 11, wherein the number of units being processed for the first token and at least one second token are identical to each other.

15. The method of claim 11, wherein the number of units being processed for the first token and at least one second token are distinct from each other.

* * * * *